United States Patent [19]

DeOms et al.

[11] Patent Number: 4,699,335
[45] Date of Patent: Oct. 13, 1987

[54] AIRCRAFT WINDOW CLAMPING DEVICE

[75] Inventors: James H. DeOms, Baltimore; Albert B. Simon, Ellicott City, both of Md.

[73] Assignee: The United States of America as represented by the Secretary of the Air Force, Washington, D.C.

[21] Appl. No.: 788,189

[22] Filed: Oct. 16, 1985

[51] Int. Cl.$^4$ ................................................. B64C 1/14
[52] U.S. Cl. .................................. 244/129.3; 52/400; 52/573; 411/526; 403/372; 248/346
[58] Field of Search ................. 244/129.3, 129.4, 121, 244/306–308; 52/80, 397, 208, 400, 200, 573, 171; 248/310, 316.1, 500, 346, 56, 68.1; 411/526; 403/372, 371, 326; 220/319; 296/84 A, 93

[56] References Cited

U.S. PATENT DOCUMENTS

| | | |
|---|---|---|
| 2,088,884 | 8/1937 | Ulrich et al. . |
| 2,258,724 | 10/1941 | Wagner et al. . |
| 2,264,489 | 12/1941 | Tiegler et al. ...................... 248/346 |
| 2,377,863 | 6/1945 | Campbell ............................. 52/208 |
| 2,427,557 | 9/1947 | Gregorius . |
| 2,659,462 | 11/1953 | Schwartz et al. . |
| 2,856,650 | 10/1958 | Hildebrand . |
| 2,929,603 | 3/1960 | Stewart ................................ 248/500 |
| 3,308,588 | 3/1967 | Von Wedel ........................... 52/397 |
| 3,455,073 | 7/1969 | Kiekhaefer ............................ 52/80 |

FOREIGN PATENT DOCUMENTS 484372   6/1952   Canada ............................. 244/129.3

OTHER PUBLICATIONS

Hornsey, "Testing of Glass Passenger Windows for Commercial Aircraft", PPG Industries, Inc., 10-22-84.

Primary Examiner—Galen Barefoot
Attorney, Agent, or Firm—Stanton E. Collier; Donald J. Singer

[57] ABSTRACT

An aircraft window clamping ring is used to hold an optical sensor window against an aircraft wall. The ring has a plurality of cantilevers having upper contacts that bear directly down on the window. Because of the flexibility in the vertical direction, thermal expansion is compensated for by movement of the cantilevers. Horizontal expansion of the window creates no additional stress because the upper contacts bear perpendicular to possible horizontal movement. The cantilevers can be designed to preload the window to take into account maximum thermal expansion.

2 Claims, 5 Drawing Figures $\Sigma F_x = 0 = F_{ax} - F_{ax}$ $\Sigma F_y = 0 = 2F_{ay} - 2F_s$ WHEN $P_o = P_c$

AIRCRAFT WINDOW CLAMPING DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to windows on aircraft and, in particular, relates to devices for attaching windows to high performance military aircraft. These windows are used for optical systems such as cameras, sensors, gimbals, etc.

As is well known to those skilled in the art, windows of this type must be mounted in such a manner that the connection between the window and the wall can withstand the stresses exerted on it by the net pressure thereabout, that the connection between the window and the wall is leakproof and does not allow the air to escape. Further, since such windows consist of a material different from the material constituting the walls of such compartments, the dimensions of these windows change differently under the influence of temperature changes. For instance, if the windows consist of transparent artificial resin, their expansion under the influence of temperature rises is considerably greater than that of the walls of the compartment which as a rule consist of a light metal. If the connection of such windows with the wall is unyielding, this connection is not only acted upon by the forces resulting from the net pressure, but also by forces arising in consequence of the difference in expansion and contraction of the windows on the one hand and the walls on the other hand. Consequently, this connection must be so chosen as to be able to withstand comparatively great forces. This is especially true in military applications where many extreme environments are encountered and the components must be kept as small and as lightweight as possible.

A prior device for mounting curved windows to aircraft walls, for example, is a clamping ring having an inwardly slanting flange. This flange bears directly upon the window. Both the window and the clamping ring are in contact with the aircraft wall. An O-ring is placed between the window and the aircraft wall at the point of contact to maintain a pressure and liquid seal. The clamping ring is bolted to the aircraft wall.

The environment inside the optical system is normally controlled to prevent moisture from condensing on the optics as the aircraft changes altitudes, speeds, etc. To prevent this, the optical system environment is filled with dry nitrogen, for example. This results in pressure differentials between the controlled environment (Pc) and the outside environment (Po). A net force therefrom puts additional stress on the window. Although the clamping ring with a flange is simplest to fabricate, it has the undesirable effect of restraining rigidly the window in the x and y directions, the x-direction being parallel to the aircraft wall. If there was a uniform temperature expansion coefficient between the components, the above clamping ring would be sufficient, but because of differences, the window can either shrink and become lose or expand and become over stressed because of a nonyielding clamping ring.

SUMMARY OF THE INVENTION

The instant invention sets forth an aircraft window clamping ring overcoming the problems noted hereinabove.

In the case of a curved window, a wedge ring is fixedly attached to the outer perimeter of the outer curved surface of the window to provide a flat surface upon which the clamping ring can bear. The clamping ring has a base that is bolted to the aircraft wall. A plurality of spring-like cantilevers are attached to the base and extend centrally. An upper contact of the cantilever bears directly down upon the wedge ring. The window is held against the aircraft wall with a pressure seal therebetween and is positioned within the base with a flexible adhesive.

It is therefore one object of the present invention to provide a clamping ring having no force components which directly put bending stresses in the window;

Another object of the present invention is to provide a clamping ring such that the clamping forces are controlled by the ring characteristics so that precise torquing of the fasteners is not required;

Another object of the present invention is to provide an assembly comprising the ring and window assembled and bonded such that the required optical centering of the window can be maintained during repeated installations with no measurements or adjustments required;

Another object of the present invention is to provide an assembly that provides protection for the brittle window during storage, handling, and installation;

Another object of the present invention is to provide a window and wedge ring that have thermal expansion characteristics matched as close as possible to avoid window stress due to differential thermal expansion; and Another object of the present invention is to provide an assembly adaptable to many different designs due to the ease of changing the materials used and/or the geometry.

These and many other objects and advantages of the present invention will be readily apparent to one skilled in the pertinent art from the following detailed description of a preferred embodiment of the invention and the related drawings.

BRIEF DESCRIPTIONS OF THE DRAWINGS

FIG. 1 illustrates a prior art assembly;
FIG. 2 illustrates the forces involved;
FIG. 3 illustrates by cross-section a wedge ring on a curved window;
FIG. 4 is a perspective view of the present invention; and
FIG. 5 is a detailed cross-section of a clamping ring of the present invention.

DETAILED DESCRIPTION OF THE PREFERRED EMBODIMENT

Figure 1:
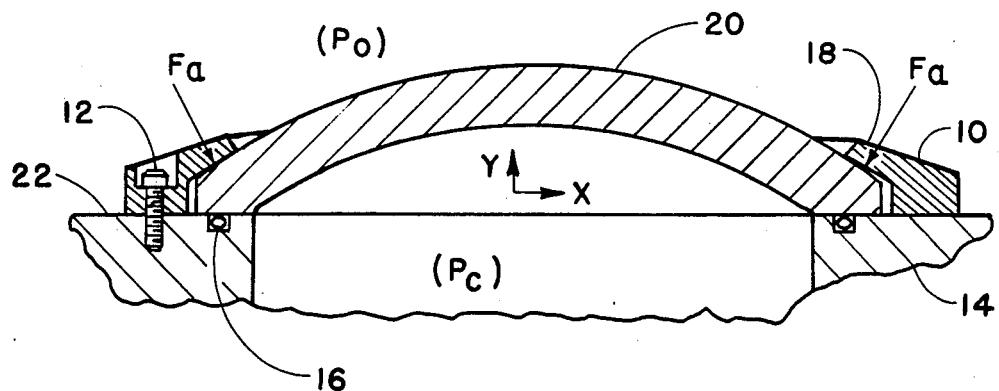
Figure 2:
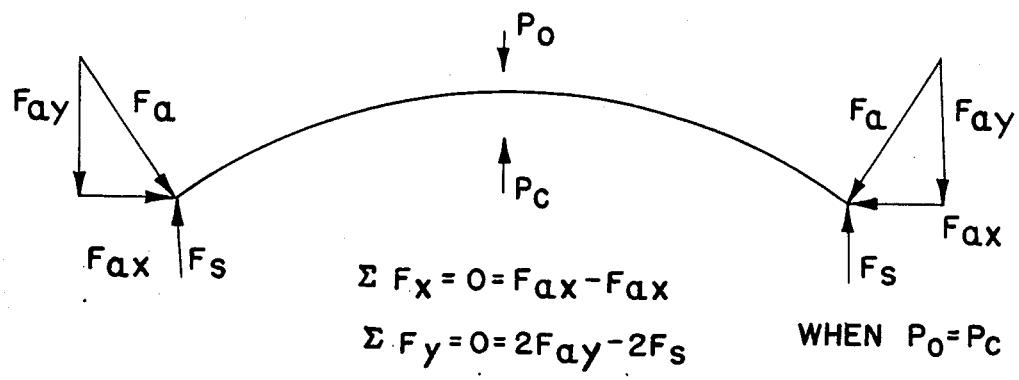

FIG. 1 illustrates by cross-section a prior art clamping ring 10 that is attached by a plurality of bolts 12 to an aircraft wall 14. A flange 18 being an upper part of clamping ring 10 presses against a window 20. Flange 18 is continuous about ring 10. Window 20 is meant to represent any rigid optical medium, including a lens, for example. Window 20 may be curved or flat and may be circular shaped or otherwise. Flange 18 holds window 20 against an outside surface 22 of wall 14. As seen in FIGS. 1 and 2, the force applied (Fa) by clamping ring 10 is obtusely located relative to surface 22 so that the x-component of the force applied, Fax, acts radially upon window 20. Although forces Fax cancel in a symmetric system, these still place bending stress on window 20. Thermo expansion can further increase the forces applied beyond limits.

In a non-curved window, Fa would be perpendicular to surface 22 and thus thermo expansion in the y-axis would be of concern. Thermo expansion in the x-axis would not cause additional stress.

A further force acting upon window 20 is the net pressure differential between the outside environment (Po) and the controlled environment (Pc). The pressure differential, if positive, acting in the y-axis direction, and a thermal expansion acting together could cause the failure of window 20.

Figure 3:
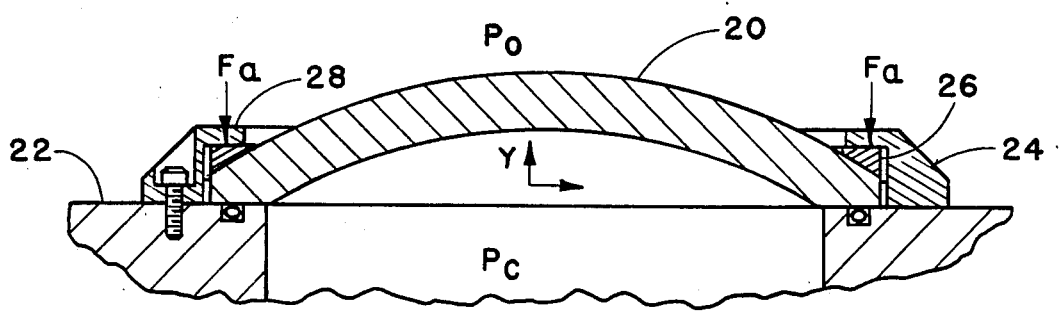

In order to reduce the x-axis forces acting on window 20 if it is curved as shown in FIG. 3, a modified clamping ring 24, FIG. 3, acts upon a wedge ring 26 that is attached to window 20. The material of wedge ring 26 is selected to match the thermal expansion coefficient of window 20. Thus flange 28 acts directly downward upon wedge ring 26. Expansion or contraction in the x-axis of window 20 places no additional stress thereupon except that of friction between wedge ring 26 and flange 28 and between window 20 and surface 22. Unfortunately, expansion or contraction in the y-axis direction is still a problem for clamping ring 24 of FIG. 3.

Figure 4:
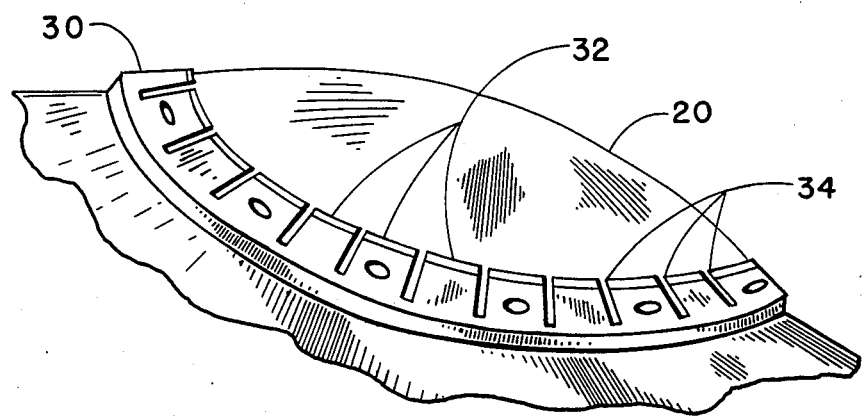
Figure 5:
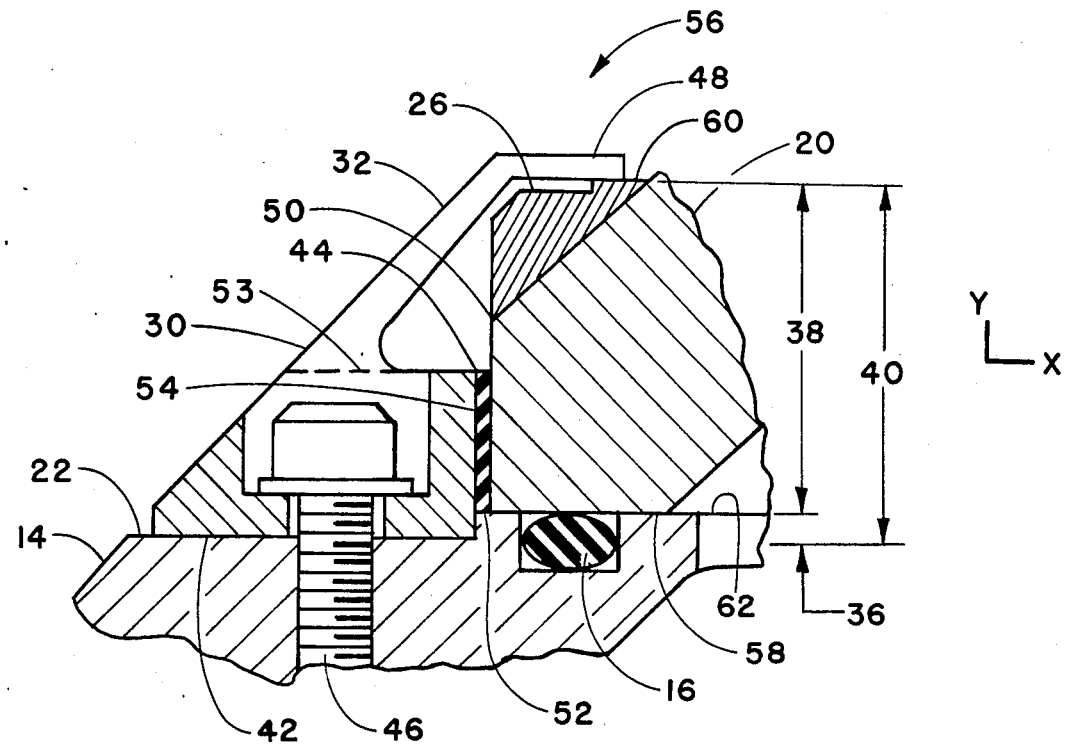

FIG. 4 illustrates a clamping ring 30 of the present invention in perspective. A plurality of cantilevers 32 flexibly press upon window 20. A plurality of narrow slits 34 separate cantilevers 32. A single cantilever 32 is shown in FIG. 5 in greater detail.

As seen therein clamping ring 30 has a base 42 which is bolted, by bolt 46, for example, to surface 22 of wall 14. Attached unitarily to base 42 are a plurality of spring-like cantilevers 32. Dotted line 53 defines the top of base 42 upon which cantilevers 32 are positioned. Cantilever 32 has an upper contact 48 that bears directly downward on wedge ring 26 that is fixedly attached to window 20 by conventional adhesives. Window 20 has an outer edge 50 that is separated by a short gap 52 from an inside edge 54 of base 42. Gap 52 is filled with a flexible adhesive 44 which holds window 20 within clamping ring 30 as an unitary window assembly 56 and allows x-axis movement.

The present invention thus allows for thermal expansion or contraction in both the x-axis and y-axis. Thermal expansion, for instance, causes cantilever 32 to flex upwardly. Thermal contraction is further remedied by mounting clamping ring 30 so that cantilever 32 is normally flexed upwardly a fixed amount in the steady state. This is accomplished by making the distance 40, unflexed, less than the sum of distances 36 and 38. Distance 38 is the distance from a top 60 of wedge ring 26 to a support surface 58 of window 20. Distance 36 is the distance between outside surface 22 and a seat surface 62 of wall 14. Distance 36 is a positive value if seat surface 62 is above outside surface 22. Distance 40 can be varied during design to put a specific preload on window 20 by upper contact 48. This preload is set to be just enough to keep O-ring 16 compressed and to offset the maximum differential thermal expansion expected. As is seen in FIG. 5, window 20 can be either flat or curved. If flat, wedge ring 26 would not be required.

The present invention has the following features:

(1) The clamping action of clamping ring 30 has no force components which directly put bending stresses in window 20. This allows a thinner, lighter window 20 to be used.

(2) The clamping forces are controlled by ring 30 characteristics so that precise torquing of the fasteners is not required. This eliminates the possibility of overtorquing which could overstress window 20 and the possibility of under-torquing which could cause leakage.

(3) Ring 30 and window 20 are assembled and bonded such that the required optical centering of window 20 can be maintained during repeated installations with no measurements or adjustments required.

(4) The bonding of the ring 30 and window 20 provides protection for the brittle window 20 during storage, handling, and installation.

(5) The thermal expansion characteristics of the wedge ring 26 and window 20 are matched as close as possible to avoid window 20 stress due to differential thermal expansion.

(6) The window assembly 56 is adaptable to many different designs due to the ease of changing the materials used and/or the geometry.

Clearly, many modifications and variations of the present invention are possible in light of the above teachings and it is therefore understood, that within the inventive scope of the inventive concept, the invention may be practiced otherwise than specifically claimed.

What is claimed is:

1. An aircraft window clamping device for holding a convex window against a wall of an aircraft, said aircraft window clamping device comprising:
    a base, said base being formed to closely fit about said window, said base having an inside surface facing an outer edge of said window, said base having a botom surface formed to fit an outside surface of a first wall having a port therethrough over which said window is positioned, said base having means for allowing attaching means to hold said base to said first wall;
    means for flexibly holding said window in said base, said means for flexibly holding attached between said inside surface of said base and said outer edge of said window, said means for holding allowing the removal of said base and said window as a unit;
    means for environmentally sealing said window to a second wall, said means for sealing being substantially located in said second wall, said first and second wall being attached to said aircraft;
    a plurality of cantilevers integrally attached to a top of said base about said port;
    each of said cantilevers being separated respectively by a slit to promote flexibility of said cantilevers;
    each of said contilevers having an upper contact, said upper contact being flexibly biased against said window when said base is clamped to said first wall, said window being subjected to high differences in air pressures and temperatures when in use and
    said convex window having a wedge ring mounted thereon, said upper contacts of said cantilevers bearing upon an upper surface of said wedge ring, a lower surface of said wedge ring bearing upon said convex window, whereby said cantilevers are flexed when said window clamping device is attached to said first wall with said convex window therein such that said cantilevers are constantly flexed to provide sufficient thermal expansion of said window.

2. An aircraft window clamping device as defined in claim 1 wherein said first and second walls are coplanar.

* * * * *